US007648089B2

(12) United States Patent
Huang

(10) Patent No.: US 7,648,089 B2
(45) Date of Patent: Jan. 19, 2010

(54) SHREDDER SAFETY INTERLOCK SWITCH ACTIVATION TAB

(75) Inventor: Simon Huang, Taipei (TW)

(73) Assignee: Michilin Prosperity Co., Ltd. (TW)

( * ) Notice: Subject to any disclaimer, the term of this patent is extended or adjusted under 35 U.S.C. 154(b) by 0 days.

(21) Appl. No.: 11/998,034

(22) Filed: Nov. 28, 2007

(65) Prior Publication Data

US 2009/0134254 A1 May 28, 2009

(51) Int. Cl.
*B02C 19/00* (2006.01)
*A01F 21/00* (2006.01)

(52) U.S. Cl. ..................................... 241/37.5; 241/100

(58) Field of Classification Search ................ 241/37.5, 241/100, 236

See application file for complete search history.

(56) References Cited

U.S. PATENT DOCUMENTS 3,935,812 A * 2/1976 Karls et al. ................. 100/214
4,320,317 A * 3/1982 Bowey ..................... 310/68 B
4,685,624 A * 8/1987 Nidiffer et al. ................ 241/36
5,397,068 A * 3/1995 Solomons et al. ........... 241/100
5,969,310 A * 10/1999 Schwelling .............. 200/61.41
6,079,645 A * 6/2000 Henreckson et al. ....... 241/37.5
6,116,528 A * 9/2000 Schwelling .................. 241/36

* cited by examiner

*Primary Examiner*—Faye Francis
(74) *Attorney, Agent, or Firm*—Venable LLP; Roy A. Kim, Esq.

(57) ABSTRACT

The present invention relates generally to tabs that activate shredder safety interlock switches. Specifically, this invention discloses a break-resistant tab which can readily activate a shredder safety interlock switch. The disclosed tab is comprised of a tab extension with at least one flexing member or spring which allows for limited flexibility.

4 Claims, 8 Drawing Sheets

SHREDDER SAFETY INTERLOCK SWITCH ACTIVATION TAB

BACKGROUND OF THE INVENTION

1. Field of the Invention

The present invention relates generally to tabs that activate shredder safety interlock switches. Specifically, this invention discloses a break-resistant tab which can readily activate a shredder safety interlock switch.

2. Background Information

With increased privacy concerns, shredders have become an integral part in both homes and businesses. Though originally used to destroy paper products, shredders are now used to shred other forms of media that hold information, such as compact discs. In addition, credit cards and other plastic products are commonly shredded.

Conventional shredder housings sit on top of a waste receptacle or base. The housing has a safety interlock switch which is activated when it is placed on the waste receptacle or base. The safety interlock switch is engaged by a safety interlock switch activation appendage or tab located in the base. Activation of the safety interlock switch is necessary to turn on the shredder and only occurs when the shredder housing is placed properly on the base such that the tab in the base engages the safety interlock switch through a narrow slot in the housing. The purpose of the safety interlock switch is to prevent the shredder from being turned on when the shredder housing is not on the receptacle or base. The safety interlock switch thus prevents a user from accessing the shredder blades from underneath while the shredder is on.

Conventional tabs are inflexible and made of a rigid material such as plastic or metal. They are thus prone to break when the shredder housing is not placed precisely on the base. In such cases the tab fails to go through the narrow slot in the housing and engage the safety interlock switch, instead, hitting the housing itself. This impact often results in the tab breaking.

Accordingly, the present invention seeks to employ various shredder safety interlock switch tabs which are resistant to breaking.

The preferred embodiments provide this by incorporating a tab with limited flexibility. Such a tab is resistant to breaking as it is capable of giving when pressure is exerted on it. In addition, the limited flexibility facilitates the tab passing through the housing narrow slot and ultimately activating the safety interlock switch.

From the preceding descriptions, it is apparent that the devices currently being used have significant disadvantages and/or limitations. Thus, important aspects of the technology used in the field of invention remain amenable to useful refinement.

SUMMARY OF THE INVENTION

The present invention relates to an apparatus that satisfies the need for a shredder safety interlock switch tab that is resistant to breaking and that more readily passes through the housing narrow slot to engage the safety interlock switch.

In preferred embodiments, the safety interlock switch tab ("tab") is comprised of a tab extension which rests on top of a flexing member or spring. The flexing member or spring allows the tab extension limited movement in both horizontal and vertical planes. This flexibility reduces the likelihood of the tab extension breaking when the housing is not properly aligned with the base. In addition, if there is a minor misalignment, the flexibility increases the likelihood that the tab extension will fit through the housing narrow slot ("slot") and engage the safety interlock switch ("switch").

In other preferred embodiments, the tab extension has side and bottom flexing members or springs and fits inside a tab seat. The flexing members or springs again allow for limited horizontal and vertical movement, thus decreasing the likelihood that the tab extension will break, while increasing the likelihood that the tab extension will pass through the slot and engage the switch.

All of the foregoing operational principles and advantages of the present invention will be more fully appreciated upon consideration of the following detailed description with reference to the drawings.

BRIEF DESCRIPTION OF THE DRAWINGS

The features and advantages of this invention are better understood with regard to the following drawings, description, and claims. The drawings consist of the following:

DETAILED DESCRIPTION OF THE INVENTION

Figure 1:
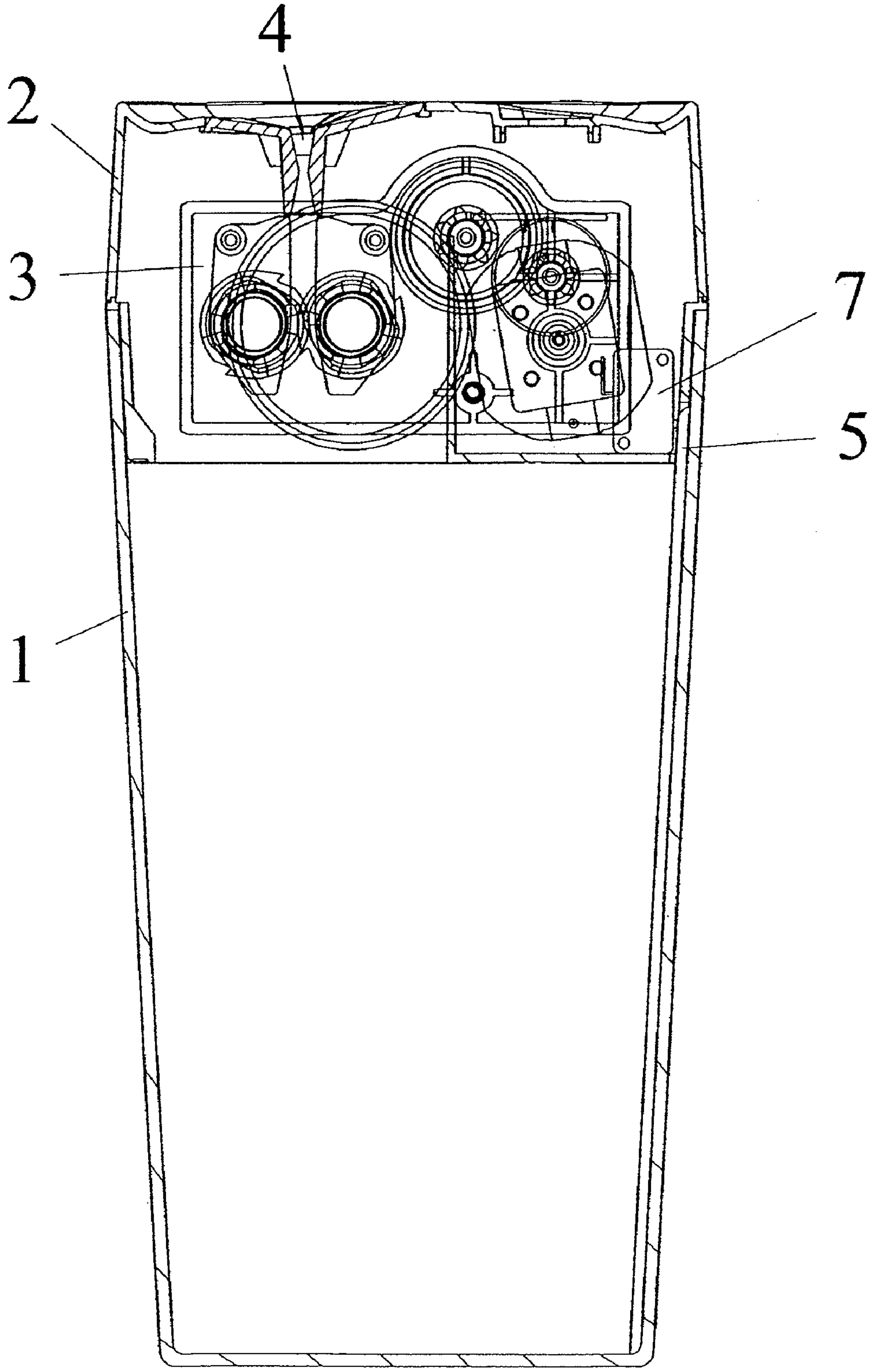
Figure 1 Prior Art
FIG. 1 is a cross-sectional side view of a prior art shredder.

The essential elements of a shredder are comprised of a base or receptacle 1, a housing 2, and a shredder mechanism 3 which is located inside the housing 1. The housing 1 has an opening or throat 4 that leads to the shredding mechanism 2. Material to be shredded is then fed through the throat 4 and into the shredding mechanism 2.

Figure 2:
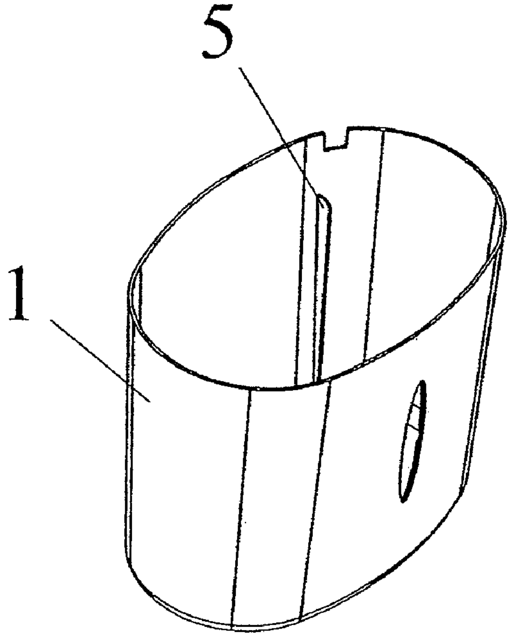
Figure 2 Prior Art
FIG. 2 is a perspective view of a prior art base.
Figure 3:
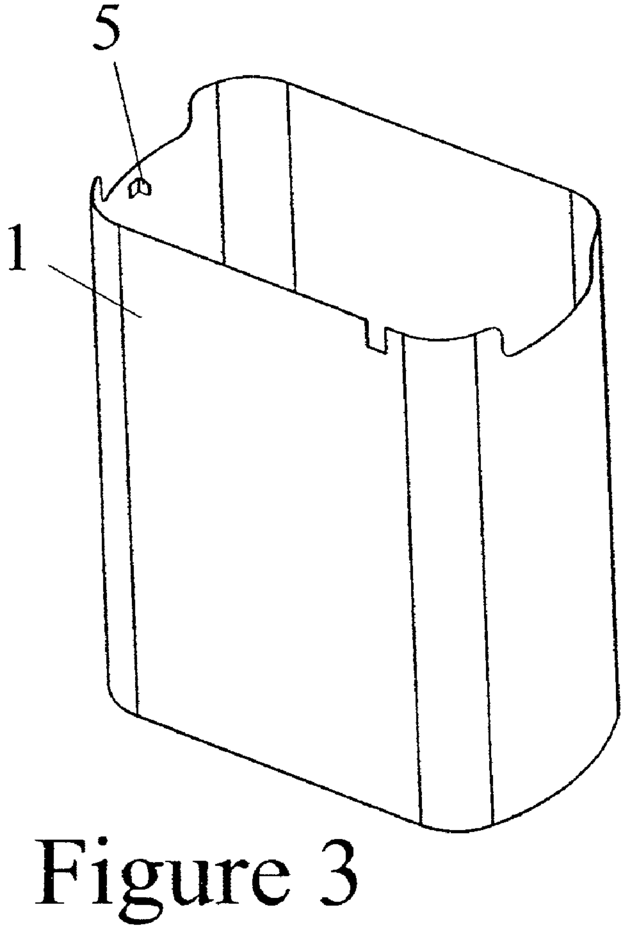
Figure 3 Prior Art
FIG. 3 is a perspective view of a prior art base.
Figure 4:
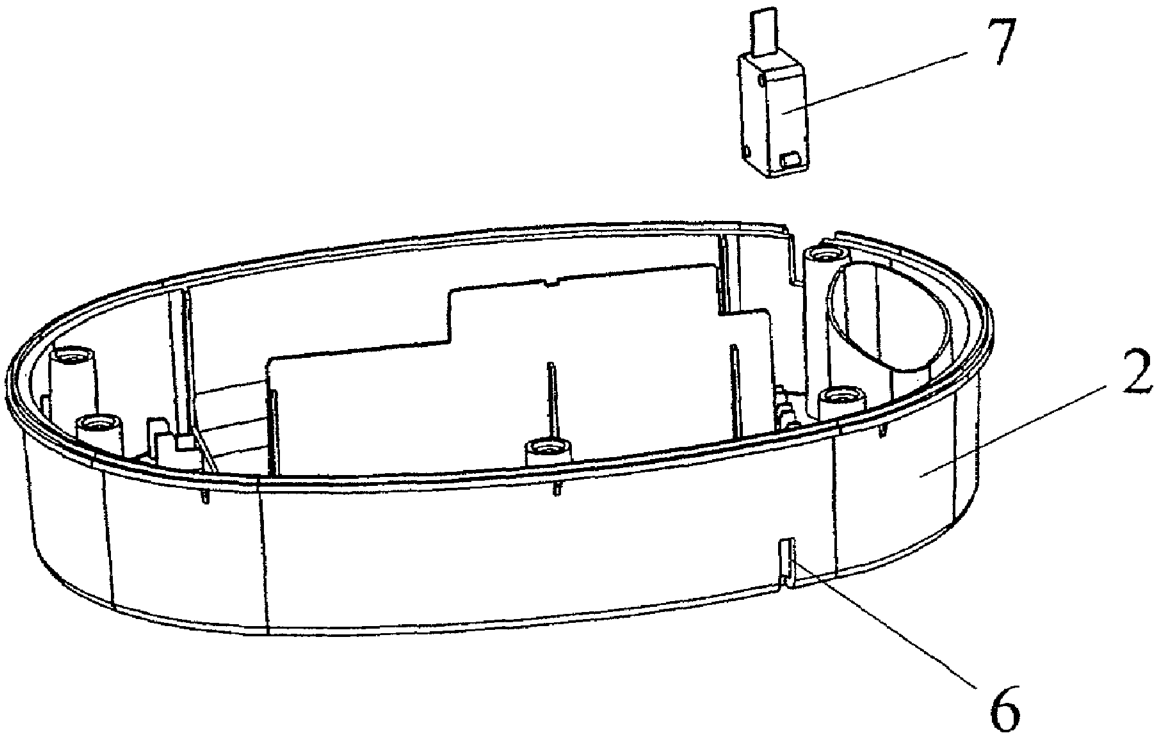
Figure 4 Prior Art
FIG. 4 is a perspective view of a safety interlock switch and a portion of a shredder housing.

FIGS. 1-4 illustrate the prior art. As seen in FIGS. 2 and 3 a rigid safety interlock switch tab ("tab") 5 is located on the inside of the base. When the shredder is properly aligned, the tab 5 fits through the narrow slot 6 in the housing 2 and engages the safety interlock switch 7 inside of the housing 2. Once the safety interlock switch 7 is engaged, the shredder may be turned on.

Figure 5:
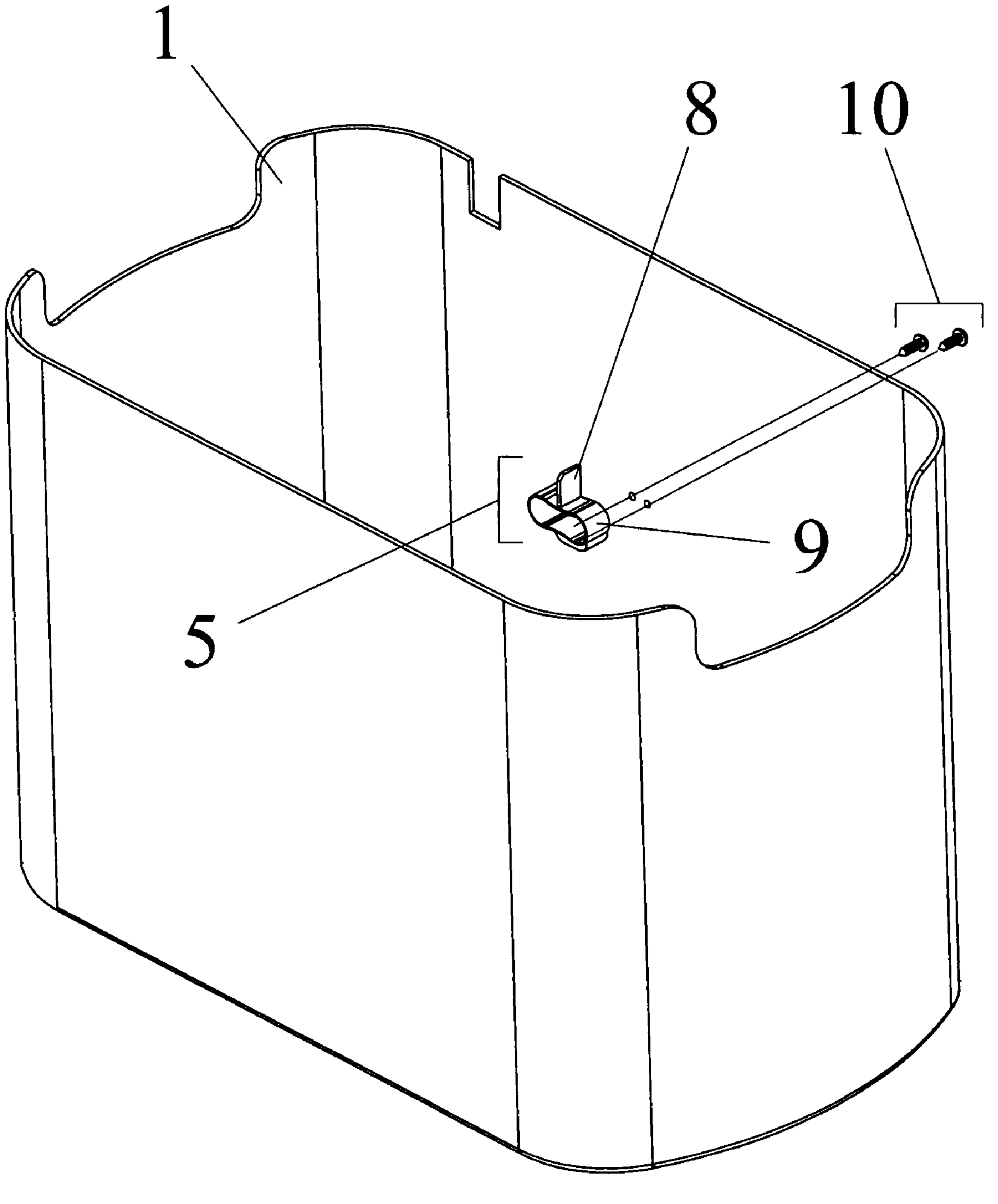
FIG. 5 is a perspective view of an apparatus embodying features of this invention.

FIG. 5 discloses a preferred embodiment of the present invention in which the tab 5 is comprised of a tab extension 8 seated above a flexing member 9 which allows for limited movement. The disclosed flexing member 9 and tab extension 8 are preferably made of a material that allows for the flexing member 9 to be pliable and resilient, while keeping the tab rigid 8. Certain plastics or metals, as readily known to those skilled in the art qualify, and the rigidity in the tab extension 8 can simply be achieved by making the tab extension 8 thicker than the flexing member 9.

The tab extension 8 may be integral with the flexing member 9 such that the tab extension 8 and flexing member comprise 9 one piece, or the tab extension 8 and flexing member 9 may be separate components with the tab extension 8 coupled to the flexing member 9.

Although the figure discloses the tab 5 coupled to the base via screws 10, it should be appreciated that any coupling mechanism readily known to those skilled in the art may be used. In addition, the tab 5 may also be made from the same mold as the base 1, such that there are no separate components and the tab 5 is integral with the base 1.

Figure 6:
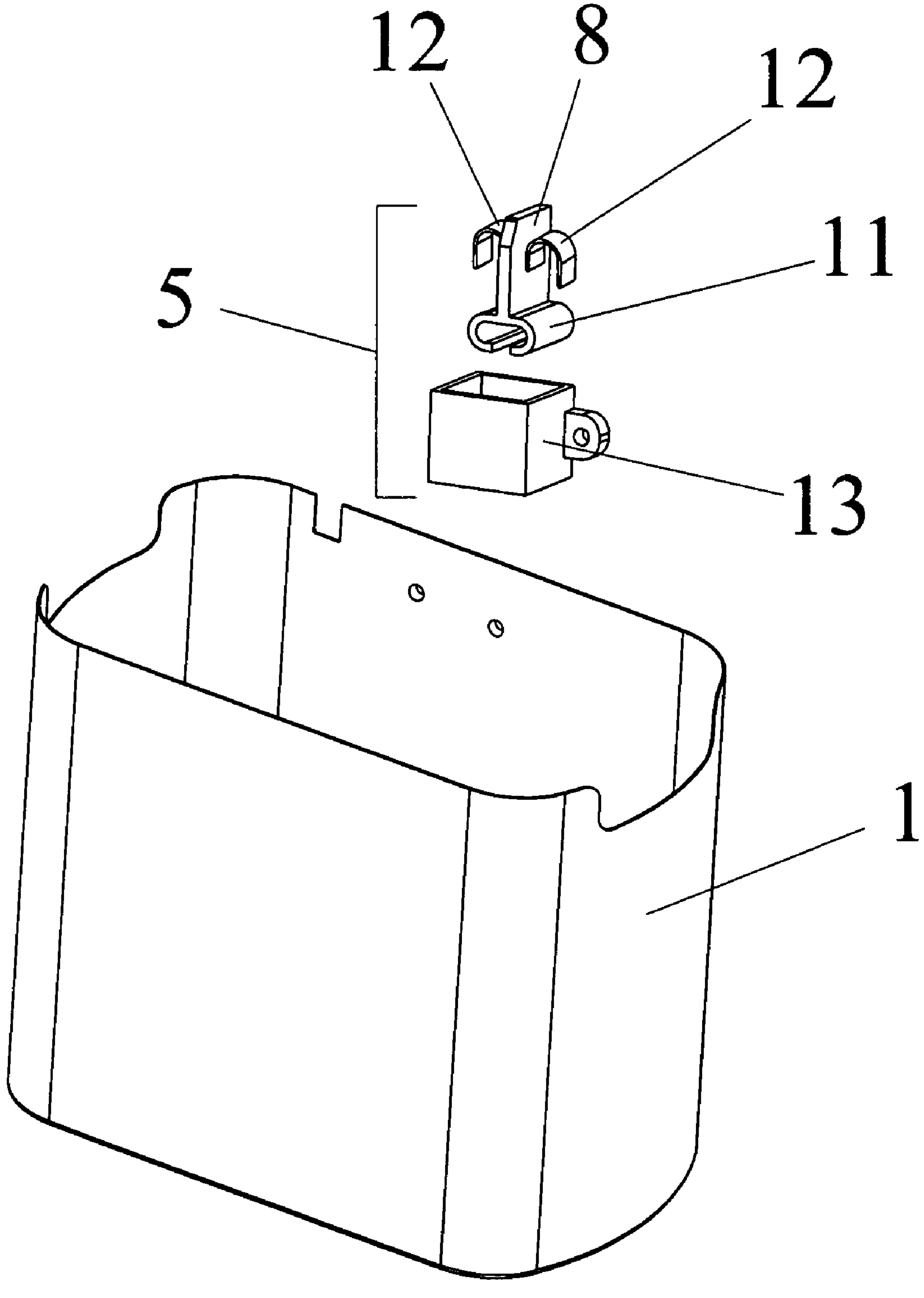
FIG. 6 is a perspective view of an apparatus embodying features of this invention.

FIG. 6 discloses another preferred embodiment of the present invention in which the tab extension 8 has a bottom flexing member 11 and side flexing members 12. The tab extension 8 with side and bottom flexing members is then seated inside a tab seat 13 which is then coupled to the base. The side flexing members 12 allow for limited flexibility in the horizontal plane and the bottom flexing member 11 allows for limited flexibility in the vertical plane. As seen in FIG. 6 the tab extension 8, side flexing members 12, and bottom flexing member 11 are integral being made from one mold.

Figure 7:
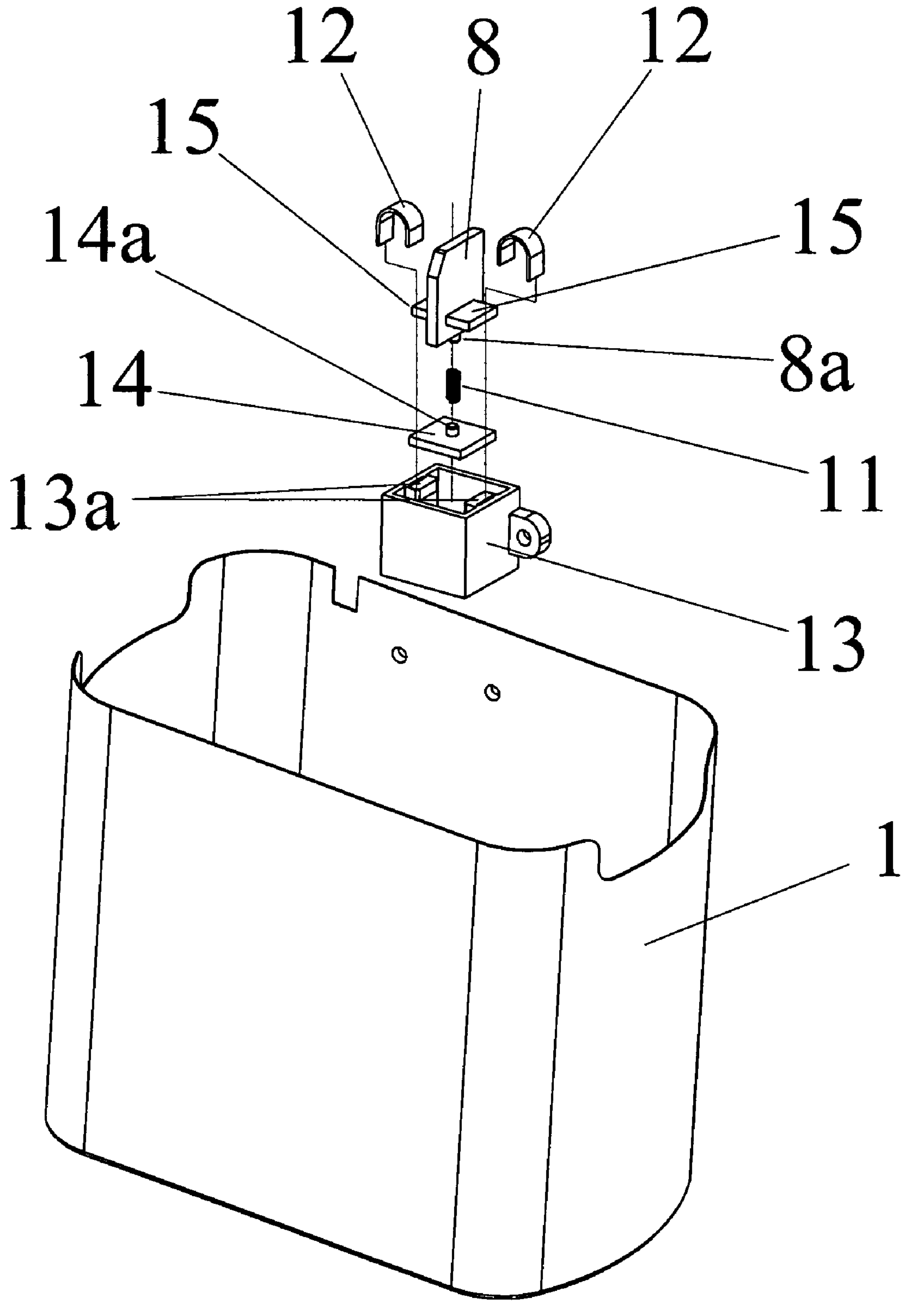
FIG. 7 is a perspective view of an apparatus embodying features of this invention.

FIG. 7 discloses another preferred embodiment in which the tab extension 8 and flexing members are comprised of separate components. The side flexing members 12 are U-shaped, while on the bottom a conventional coil spring 11 is disclosed. The coil spring 11 couples to an appendage 8(*a*), at the bottom of the tab extension (8) and to an appendage 14(*a*) on the top of a base 14 which fits in the tab seat 13. The tab seat 13 has links 13(*a*) through which the side flexing members 12 pass and are secured to the tab seat 13. The tab extension 8 also has side arms 15 which limit the amount of horizontal movement.

Figure 8:
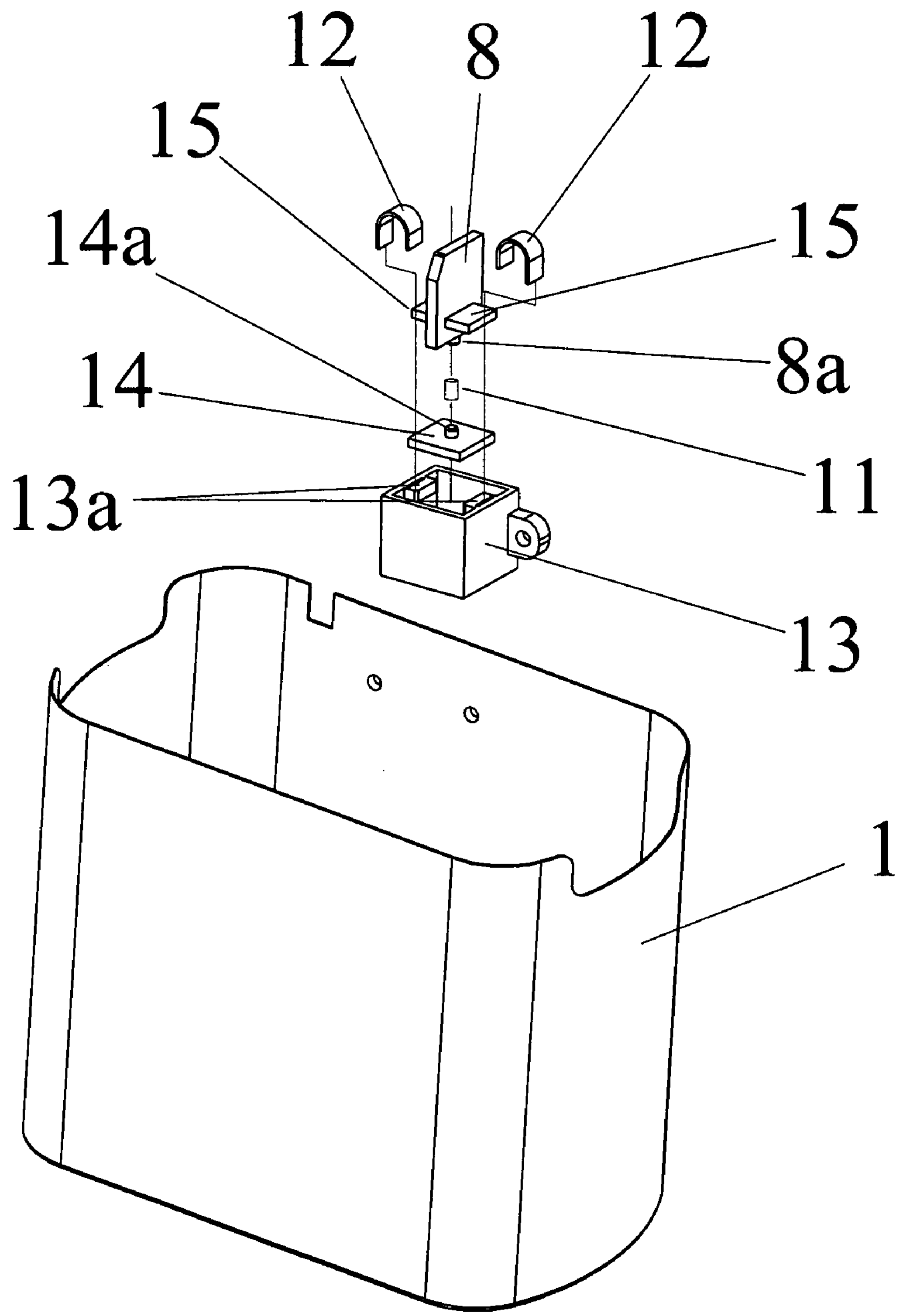
FIG. 8 is a perspective view of an apparatus embodying features of this invention.
Figure 9:
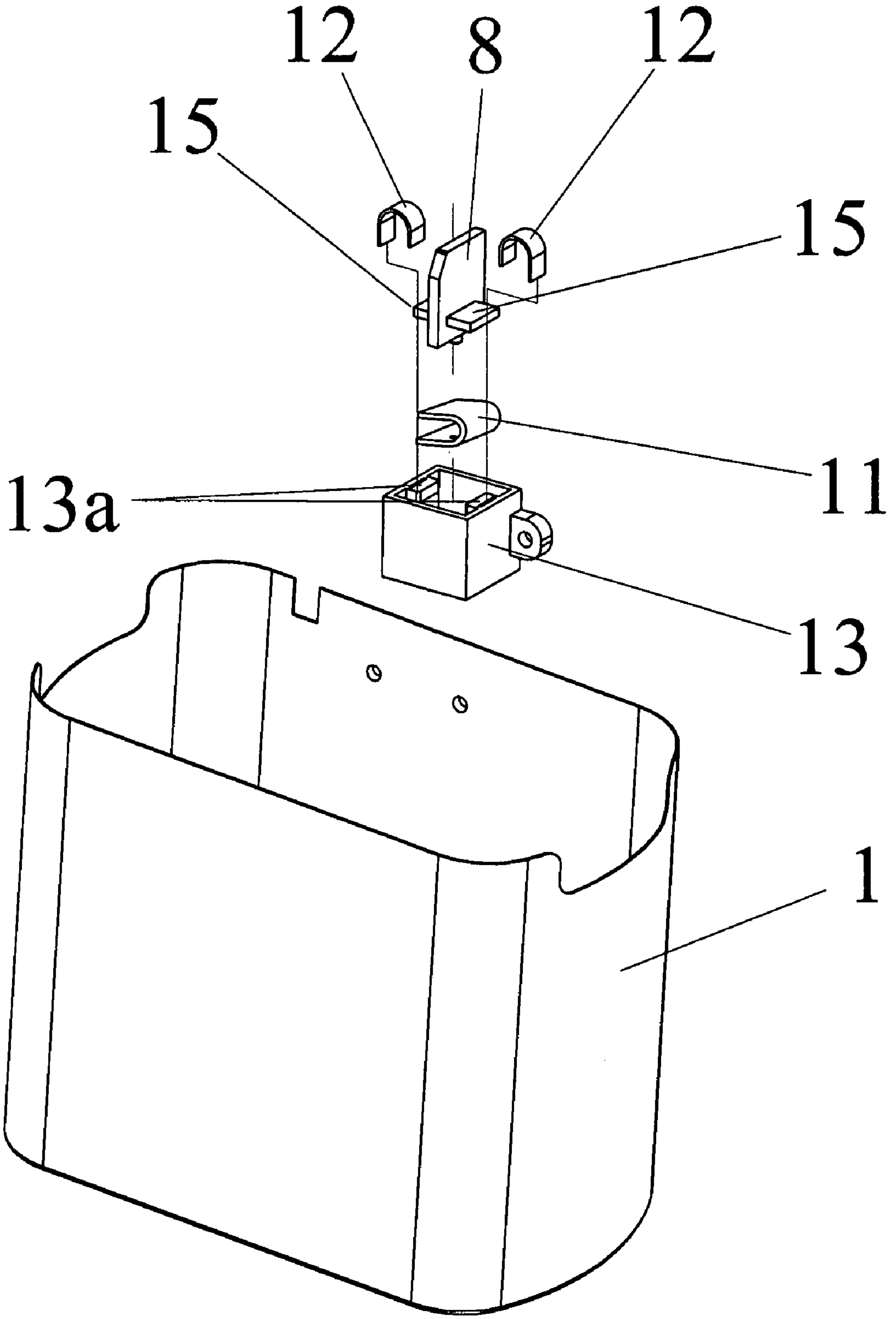
FIG. 9 is a perspective view of an apparatus embodying features of this invention.

FIGS. 8 and 9 disclose other preferred embodiments in which the coil spring in the bottom is replaced with a rubber flexing member 11 or a U-shaped flexing member 11 respectively. It should be appreciated that although the preferred embodiments disclose specific types of flexing members and springs, any flexing member or spring mechanism may be used as readily known to those skilled in the art. In addition, although the preferred embodiments disclose certain components as separate elements or as being integral, any combination of separate or integrated components may be used as readily known to those skilled in the art.

Thus, although the present invention has been described in detail with respect to certain preferred versions thereof, other versions are possible. Therefore, the scope of the claims should not be limited to the description of the preferred versions contained herein.

The invention claimed is:

1. A shredder comprised of:
(a) a base;
(b) a housing with a slot;
(c) a safety interlock switch inside of the housing and adjacent the slot;
(d) a shredding mechanism inside the housing;
(e) a throat through which material to be shredded is fed into the shredding mechanism; and
(f) a tab coupled to the base; whereby the tab is comprised of a tab extension seated above at least one flexing member which allows the tab extension to have limited movement in order to facilitate the passing of the tab extension through the slot in order to activate the safety interlock switch when the housing is placed on the base.

2. A shredder comprised of:
(a) a base;
(b) a housing with a slot;
(c) a safety interlock switch inside of the housing and adjacent the slot;
(d) a shredding mechanism inside the housing;
(e) a throat through which material to be shredded is fed into the shredding mechanism; and
(f) a tab coupled to the base; whereby the tab is comprised of a tab extension coupled to at least one spring which allows the tab extension to have limited movement in order to facilitate the passing of the tab extension through the slot in order to activate the safety interlock switch when the housing is placed on the base.

3. The shredder of claim 1 wherein the tab is integral with the base.

4. The shredder of claim 2 wherein the tab is integral with the base.

* * * * *